United States Patent
Holtzman et al.

(10) Patent No.: US 6,621,804 B1
(45) Date of Patent: *Sep. 16, 2003

(54) METHOD AND APPARATUS FOR PREDICTING FAVORED SUPPLEMENTAL CHANNEL TRANSMISSION SLOTS USING TRANSMISSION POWER MEASUREMENTS OF A FUNDAMENTAL CHANNEL

(75) Inventors: Jack Holtzman, San Diego, CA (US); Tao Chen, San Diego, CA (US)

(73) Assignee: Qualcomm Incorporated, San Diego, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/414,759

(22) Filed: Oct. 7, 1999

(51) Int. Cl.[7] .............................. H04B 7/00; H04L 3/22; H04G 7/00
(52) U.S. Cl. ..................... 370/329; 370/311; 370/276; 370/468; 370/913; 455/522
(58) Field of Search ................. 370/277, 310, 370/311, 328, 329, 431, 464, 465, 468, 913; 455/522; 709/223

(56) References Cited

U.S. PATENT DOCUMENTS

| | | | | |
|---|---|---|---|---|
| 4,261,054 A | * | 4/1981 | Scharla-Nielsen | 455/12 |
| 4,495,648 A | * | 1/1985 | Giger | 455/73 |
| 4,901,307 A | | 2/1990 | Gilhousen et al. | |
| 5,056,109 A | | 10/1991 | Gilhousen et al. | 375/1 |
| 5,103,459 A | | 4/1992 | Gilhousen et al. | 375/1 |
| 5,267,261 A | | 11/1993 | Blakeney, II et al. | 375/1 |
| 5,414,796 A | | 5/1995 | Jacobs et al. | 395/2.3 |
| 5,461,639 A | * | 10/1995 | Wheatley, III et al. | 375/205 |
| 5,504,773 A | | 4/1996 | Padovani et al. | 375/200 |
| 5,564,080 A | * | 10/1996 | Eul et al. | 455/69 |
| 5,621,723 A | * | 4/1997 | Walton, Jr. et al. | 370/18 |
| 5,634,195 A | | 5/1997 | Sawyer | 455/54.1 |
| 6,163,707 A | * | 12/2000 | Miller | 455/522 |

FOREIGN PATENT DOCUMENTS

| | | |
|---|---|---|
| EP | 0936753 | 8/1999 |
| WO | 9711535 | 3/1997 |

* cited by examiner

*Primary Examiner*—Hassan Kizou
*Assistant Examiner*—Ahmed Elallam
(74) *Attorney, Agent, or Firm*—Philip Wadsworth; Kent Baker; Sandra Godsey

(57) ABSTRACT

A method and apparatus for selecting a favored transmission slot for communicating non-voice data in conjunction with a voice-data communication. The slot, reflecting a favored power level and transmission rate for transmitting the non-voice data on a supplemental channel, is selected based upon the transmission power levels for voice-data transmitted by a base station to a remote station on a fundamental channel. The favored transmission slot is selected without the remote station messaging information to the base station concerning frequency channel or interference information for the supplemental channel.

6 Claims, 8 Drawing Sheets

METHOD AND APPARATUS FOR PREDICTING FAVORED SUPPLEMENTAL CHANNEL TRANSMISSION SLOTS USING TRANSMISSION POWER MEASUREMENTS OF A FUNDAMENTAL CHANNEL

BACKGROUND OF THE INVENTION

1. Field of the Invention

The present invention relates to wireless communications. More particularly, the invention concerns a method and apparatus for predicting power control requirements for a supplemental channel used in conjunction with a fundamental channel.

2. Description of the Related Art

Traditionally, wireless communication systems were required to support a variety of services. One such communication system is a code division multiple access (CDMA) system which conforms to the "TIA/EIA/IS-95 Mobile Station-Base Station Compatibility Standard for Dual-Mode Wideband Spread Spectrum Cellular System," hereinafter referred to as IS-95. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM," both assigned to the assignee of the present invention, and co-pending U.S. patent application Ser. No. 09/382,438, entitled "METHOD AND APPARATUS USING A MULTI-CARRIER FORWARD LINK IN A WIRELESS COMMUNICATION SYSTEM," each of which is incorporated by reference herein.

More recently, wireless systems such as the CDMA systems mentioned above have offered hybrid services, such as providing both wireless voice and data communications. To coordinate the implementation of such services, the International Telecommunications Union requested the submission of proposed standards for providing high-rate data and high-quality speech services over wireless communication channels.

In a CDMA system, a user communicates with the network through one or more base stations. For example, a user on a remote station (RS) may communicate with a land-based data source, such as the Internet, by transmitting data to a base station (BS) via a wireless link. This link between the RS and the BS is commonly referred to as the "reverse link." The BS receives the data and routes it through a base station controller (BSC) to the land-based data network. When data is transmitted from the BS to the RS, it is transmitted on the "forward link." In CDMA IS-95 systems, the forward link (FL) and the reverse link (RL) are allocated to separate frequencies.

The remote station communicates with at least one base station during a communication. However, CDMA RSs are also capable of communicating with multiple BSs simultaneously, such as during soft handoff. Soft handoff is a process of establishing a new forward and reverse link with a new base station before breaking the old links with the previous base station. Soft handoff minimizes the probability of dropped calls, that is, where a call is inadvertently disconnected from the system. A method and apparatus for providing communications between an RS and more than one BS during the soft handoff process is disclosed in U.S. Pat. No. 5,267,261, entitled "MOBILE ASSISTED SOFT HANDOFF IN A CDMA CELLULAR TELEPHONE SYSTEM," assigned to the assignee of the present invention and incorporated by reference herein.

Given the growing demand for wireless data applications, the need for very efficient voice and data wireless communication systems has become increasingly significant. One method for transmitting data in code channel frames of fixed size is described in detail in U.S. Pat. No. 5,504,773, entitled "METHOD AND APPARATUS FOR THE FORMATTING OF DATA FOR TRANSMISSION," assigned to the assignee of the present invention and incorporated by reference herein. In accordance with the IS-95 standard, non-voice data or voice data is partitioned into code channel frames that are 20 msec wide with data rates as high as 14.4 Kbps.

A significant difference between voice services and data services is the fact that voice services have stringent fixed delay requirements. Typically, the overall one-way delay of voice services must be less than 100 msec. In contrast, selectively planned data service delays, even above 100 msec, can be used to optimize the efficiency of the communication system. For example, error correction coding techniques that require relatively long delays can be used with data service transmissions.

Some parameters that measure the quality and effectiveness of data transmissions are the transmission delay required for transferring a data packet, and the average throughput rate of the system. As explained above, a transmission delay does not have the same impact in data or "non-voice" communication as it does for a voice or "voice-data" communication. Still, delays cannot be ignored because they are an important metric for measuring the quality of the data communication system. The average throughput rate is reflective of the efficiency of the data transmission capability of the communication system.

Further, in a wireless communication system, capacity is maximized when the transmission energy for a signal is kept to a minimum value while satisfying the quality performance requirements for the signal. That is, the quality of transmitted voice-data or non-voice data cannot be significantly degraded when received. One measure of the quality of a received signal is the carrier-to-interference ratio (C/I) at the receiver. Thus, it is desirable to provide a transmission power control system that maintains a constant C/I at a receiver. Such a system is described in detail in U.S. Pat. No. 5,056,109, entitled "Method and Apparatus for Controlling Transmission Power in a CDMA Cellular Telephone System," assigned to the assignee of the present invention and incorporated by reference herein.

It is well known that in cellular systems the C/I of any given user is a function of the location of the RS within a coverage area. In order to maintain a given level of service, TDMA and FDMA systems resort to frequency reuse techniques, i.e. not all frequency channels and/or time slots are used in each base station. In a CDMA system, the same frequency channel allocation is reused in every cell of the system, thereby improving the overall efficiency. The C/I associated with an RS determines the information rate that can be supported on the forward link from the base station to the user's RS. An exemplary system for transmitting high rate digital data in a wireless communication system is disclosed in co-pending U.S. patent application Ser. No. 6,574,211, issued Jan. 3, 2003, entitled "METHOD AND APPARATUS FOR HIGHER RATE PACKET DATA TRANSMISSION," assigned to the assignee of the present application and incorporated by reference herein.

Because the C/I associated with a RS determines the information rate that can be supported on the forward link, it is useful to know transmission information for each frequency channel used and historic C/I information. This information is commonly collected at the RS and messaged to the BS. But this messaging uses valuable system resources. What is needed is an invention that would eliminate such messaging requirements. Preferably, the BS transmission power levels on a first channel would be used to predict favorable slots for transmitting additional data on a second channel.

SUMMARY OF THE INVENTION

Broadly, the present invention solves a new technical challenge posed by the increasing demand for wireless communication services. The invention concerns a method and apparatus for selecting a favored transmission "slot" for non-voice data that is transmitted in conjunction with a voice-data communication. The slot, reflecting a desirable power level and transmission rate for the non-voice data, is selected based upon the transmission power levels for voice-data transmitted by a base station to a remote station.

In one embodiment, the invention may be implemented to provide a method for predicting a favored slot for transmitting non-voice data on a supplemental channel used in a wireless communication system. Generally, metrics reflecting the quality of voice-data signals sent by a base location are measured at a remote station. One or more of the metrics, or a value representing the quality of the received signal, is messaged from the remote station to the base location. If desirable, the base location may adjust the voice-data transmission power in consideration of the messages or values. Concurrently, the forward link voice-data transmission power levels are monitored at the base location. The voice-data is transmitted to the remote station using the first channel, more specifically referred to herein as a fundamental channel.

In one embodiment, a dynamic transmission power value is computed using various voice-data transmission power levels transmitted on the first channel. This value is then used to select a desired slot for transmitting additional data. This additional data is transmitted on a second channel such as a supplemental channel, shared or not shared, using a desired transmission power level and data rate for transmitting the additional data.

In another embodiment, the invention provides an article of manufacture containing digital information executable by a digital signal-processing device. In yet another embodiment, the invention yields an apparatus used to practice the methods of the invention. The apparatus may comprise a remote station and at least one base station that has, amongst other things, a transceiver used to communicate information signals to the remote station. Obviously, to receive signals, the remote station also includes a transceiver communicatively coupled to the base station, and possibly satellites where applicable. The apparatus will also include at least one digital data processing apparatus, such as a microprocessor or application specific integrated circuit (ASIC), that is communicatively coupled to the network or one of its component parts.

The invention provides its users with numerous advantages. One advantage is that it allows power control of a supplemental channel to be established based upon the base location transmitted power for voice-data. Another advantage is that the invention reduces system resource costs currently experienced by communication networks. These networks rely on messages received from a remote station regarding the quality of the supplemental channel signal as received at the remote station. Yet another advantage is that the invention allows a favorable transmission slot in any channel carrying non-voice data to be selected using historic base location transmission power levels for voice data. The invention also provides a number of other advantages and benefits that should become even more apparent after reviewing the following detailed descriptions of the invention.

BRIEF DESCRIPTION OF THE DRAWING

The nature, objects, and advantages of the invention will become more apparent to those skilled in the art after considering the following detailed description in connection with the accompanying drawings, in which like reference numerals designate like parts throughout, and wherein.

DETAILED DESCRIPTION OF EXEMPLARY EMBODIMENTS

FIGS. 1–7 illustrate examples of the various method and apparatus aspects of the present invention. For ease of explanation, but without any limitation intended, the apparatus examples are described in the context of a signal processing apparatus that may be embodied by various hardware components and interconnections. Further arrangements for these signal processing apparatuses will become apparent to anyone skilled in the art after reading the descriptions that follow.

OPERATION

IS-95 supports medium data rate (MDR) transmission of data by allowing a base location (BS) to communicate with a remote station (RS) using up to eight (8) forward links and up to eight (8) reverse links. Further advances have been made allowing for even higher data rate (HDR) transmissions using somewhat similar systems. Generally, data can be more efficiently communicated between a BS and a RS if it is transmitted at the lowest possible power level required for maintaining the quality of the communication.

Transmission of voice-data generally relies on the large number of uncorrelated users communicating with a base station and well-behaved Markov voice statistics to balance both RF capacity and RF stability. These large numbers of uncorrelated users result in a forward link RF transmit power distribution that is predictably stationary and log-normal. Without this forward link RF power predictability, forward link power control and mobile assisted handoff would be unstable.

However, transmission of non-voice data, such as downloading data from the Internet, is not as well behaved. Data traffic often comes in bursts, resulting in relatively long periods of maximum rate transmission followed by relatively long periods of minimum rate transmission. With the advent of MDR and HDR networks, these effects become even more pronounced. Unlike correlated voice links, these links switch between maximum rate and minimum rate together and power control together. This can cause the forward link power distribution as a whole to be decidedly non-stationary and non-log-normal.

In a typical communication network, RS users have different radio frequency (RF) requirements depending upon their location relative to the base station or stations with which they are in communication. The worse a user's RF environment, the more power a base station requires to deliver a fixed amount of data. Therefore, users experiencing a poor RF environment use more network capacity. For example, users in different physical locations will experience different fading conditions, such as a user passing into the RF shadow of a building, whereas another user may be passing into the RF shadow of a tree. These conditions will reduce the strength of the received signals, resulting in a poorer quality received signal than if the fade had not occurred. To overcome fading, transmission power may be increased.

Figure 1:
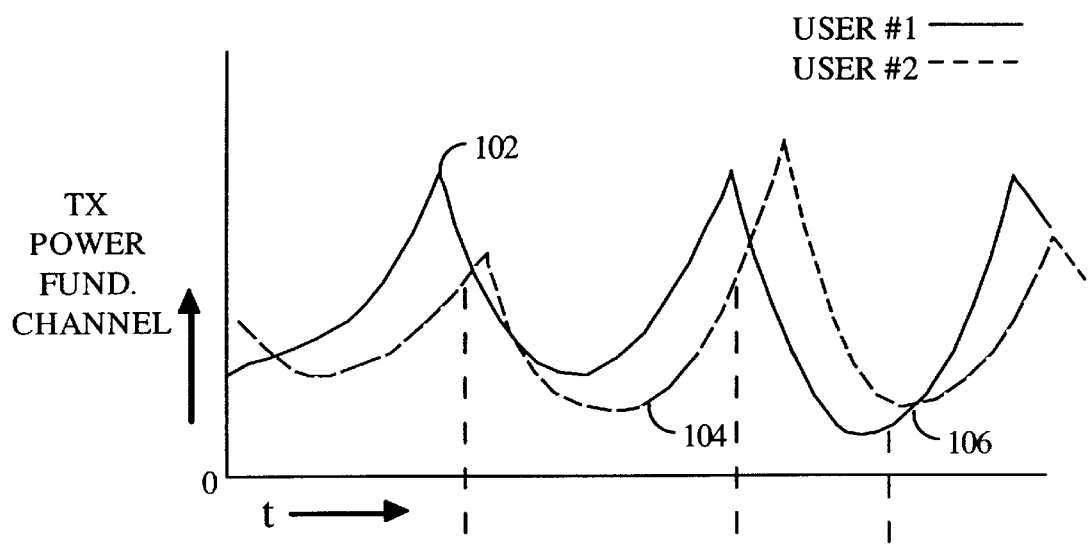
FIG. 1 illustrates transmission power fluctuations with respect to time in accordance with the invention.
Figure 2:
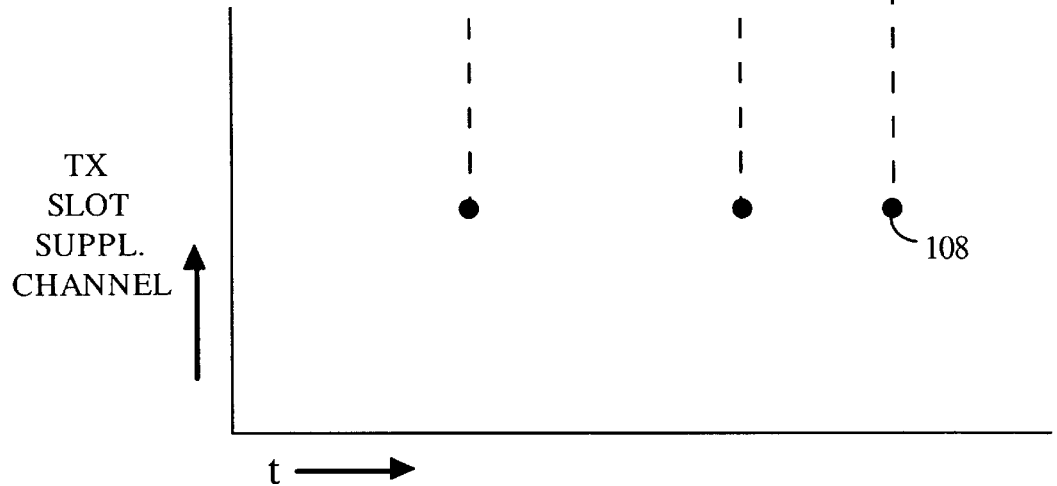
FIG. 2 illustrates favorable supplemental channel transmission powers in accordance with one embodiment of the present invention.

As shown in FIG. 1, the transmission power level for voice-data transmitted from a BS to a RS may vary with time. For example, at time 102 the power level used to transmit voice-data to a user #1 from a BS is at a maximum. At time 104, the power level required to transmit voice-data to a user #2 is at a minimum. At time 106, the average voice-data transmission power level for users #1 and #2 is at a minimum. In one embodiment of the invention, the slot 108 shown in FIG. 2 is a favorable time, or slot, to transmit additional data on the data channel of user #2. This determination is made using the voice-data transmission power levels as measured at the base location. Selecting non-voice data to be transmitted to a user on a second channel based on predicted BS power levels for voice-data transmissions on a first channel maximizes overall data throughput and does not require any quality metric messaging from the RS to the BS regarding the second channel.

This basic method assures that voice-data transmissions are guaranteed: 1) a minimum bandwidth; 2) a maximum delay window; and, 3) a given data rate. However, non-voice data users generally have less stringent communication quality requirements so the transmission data rate can be varied. However, the invention can also be used for solely non-voice data transmissions. In this embodiment, non-voice data is communicated using one or more forward link channels, but having an overall fixed total transmission power. The communication transmits at data rates that ensure the transmission power level is below the total allowable transmission power level. This is accomplished first by using a full-rate fundamental channel and then adding supplemental channels for transmitting. The transmission power used to transmit on the supplemental channels is determined from the transmission power measured at the BS for transmissions on the fundamental channel. Regardless, the transmission power levels for the channels used to transmit the non-voice data aggregate to a value below the total allowable transmission power.

Figure 3:
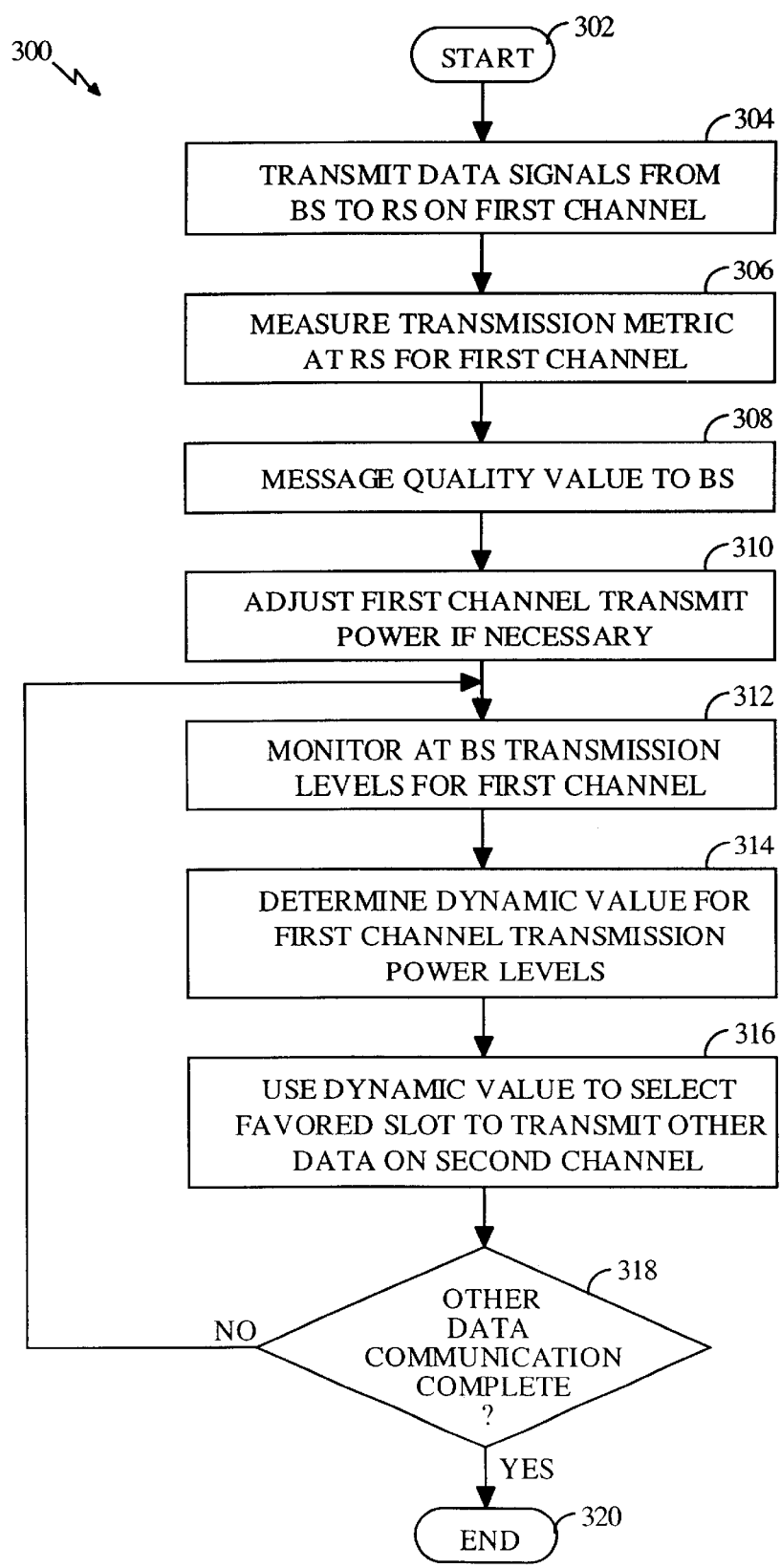
FIG. 3 shows a flow chart illustrating an operating sequence in accordance with one embodiment of the present invention.

FIG. 3 is a flow chart reflecting method steps 300 for one embodiment of the present invention as used in a CDMA network. The method starts at step 302 and data signals are transmitted in task 304 from a BS to a RS. As discussed above, this transmitted data may comprise voice and/or non-voice data transmitted on a first channel, also referred to herein as a fundamental channel. A first channel is a portion of the Forward Link Channel that carries a combination of higher-level data and power control information from the BS to the RS. A second channel is a portion of the Forward Link Channel that operates in conjunction with the first channel or a forward dedicated control channel to provide increased data delivery services. A second channel is commonly referred to as a supplemental channel, but could be a dedicated fundamental channel.

As voice-data transmissions occur, the RS receiving the transmission measures pre-selected metrics reflective of the quality of the communication received. These metrics can include bit error rate as well as other commonly used metrics. If the quality of the received signal falls off and remains poor, the RS messages a representative value to the BS in task 308. This message may indicate that an increase, decrease, or no change in transmission power for data transmitted on the first channel is required. If necessary, the transmission power level may be adjusted in task 310.

As the BS transmits data on the fundamental channel, the transmission power levels are monitored at the BS in task 312. A dynamic value reflecting the aggregated transmission levels and distributions is determined in task 314. In this embodiment, the dynamic value may reflect the momentary average transmission power level. In other embodiments, the dynamic value may be determined in a multitude of ways known in the art, so long as the dynamic value represents the lowest transmission power value at a selected point in time for first channel transmissions. Using these dynamic values, the most favored slot for transmission of data on a second channel may be predicted in task 316. Non-voice data for a RS user in need of the data may be selected and the data transmitted. If the non-voice data communication is complete, then the method ends in task 320. However, if the communication is not complete, or if transmissions intended for another user are desired, then the method repeats itself in task 318.

HARDWARE COMPONENTS AND INTERCONNECTIONS

In addition to the various method embodiments described above, a different aspect of the invention concerns apparatus embodiments used to perform the methods.

Figure 4B:
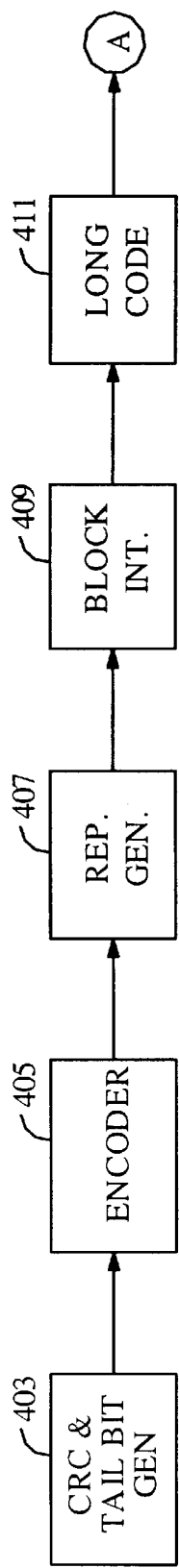
FIG. 4b is a block diagram of a general channel structure used in accordance with the invention.
Figure 4A:
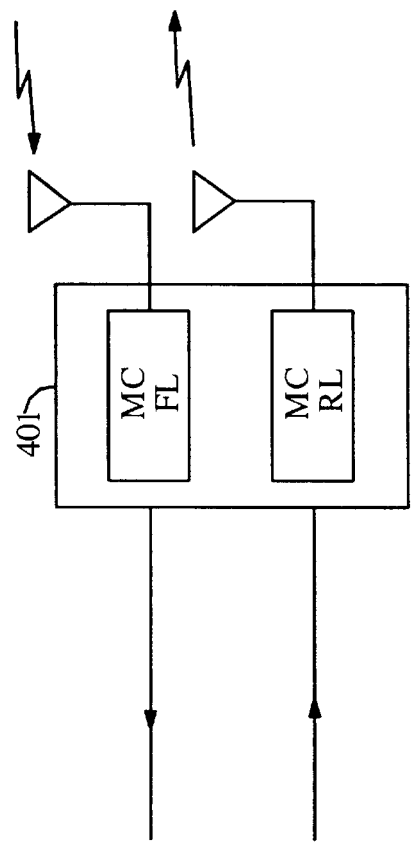
FIG. 4a is a block diagram of a general configuration for a mobile station used in accordance with the invention.

FIG. 4a shows a simple block representation of a mobile station (MS) 401 configured for use in accordance with the present invention. MS 401 receives a signal from a base station (not shown) using a cdma2000 multi-carrier FL. The signal is processed as described below. MS 401 uses a cdma2000 RL to transmit information to the base station. FIG. 4b shows a more detailed block representation of a channel structure used to prepare information for transmission by MS 401 in accordance with the present invention. In the figure, information to be transmitted, hereafter referred to as a signal, is transmitted in bits organized into blocks of bits. A CRC & tail bit generator (GEN) 403 receives the signal. The generator 403 uses a cyclic, redundancy code to generate parity check bits to assist in determining the quality of the signal when received by a receiver. These bits are included in the signal. A tail bit—a fixed sequence of bits—may also be added to the end of a block of data to reset an encoder 405 to a known state.

The encoder 405 receives the signal and builds a redundancy into the signal for error-correcting purposes. Different "codes" may be used to determine how the redundancy will be built into the signal. These encoded bits are called symbols. The repetition generator 407 repeats the symbols it receives a predetermined number of times, thus allowing part of the symbols to be lost due to a transmission error without affecting the overall quality of the information being sent. Block interleaver 409 takes the symbols and jumbles them. The long code generator 411 receives the jumbled symbols and scrambles them using a pseudorandom noise sequence generated at a predetermined chip rate. Each symbol is XOR-ed with one of the pseudorandom chips of the scrambling sequence.

The information may be transmitted using more than one carrier (channel) as explained with regards to the method, above. Accordingly, a demultiplexer (not shown) may take an input signal "a" and split it into multiple output signals in such a way that the input signal may be recovered. In one embodiment the signal "a" is split into three separate signals, each signal representing a selected data-type, and is transmitted using one FL channel per data-type signal. In another embodiment, the demultiplexer may split signal "a" into two components per data-type. Regardless of the arrangement, the present invention contemplates that distinct signals generated from a parent signal can be transmitted using one or more channels.

Further, this technique can be applied to multiple users whose signals are transmitted using completely or partially the same FL channels. For example, if the signals from four different users are going to be sent using the same three FL channels, then each of these signals is "channelized" by demultiplexing each signal into three components, where each component will be sent using a different FL channel. For each channel, the respective signals are multiplexed together to form one signal per FL channel. Then, using the technique described herein, the signals are transmitted. The demultiplexed signal is then encoded by a Walsh encoder (not shown) and spread into two components, components I and Q, by a multiplier. These components are summed by a summer and communicated to a remote station (also not shown).

Figure 5A:
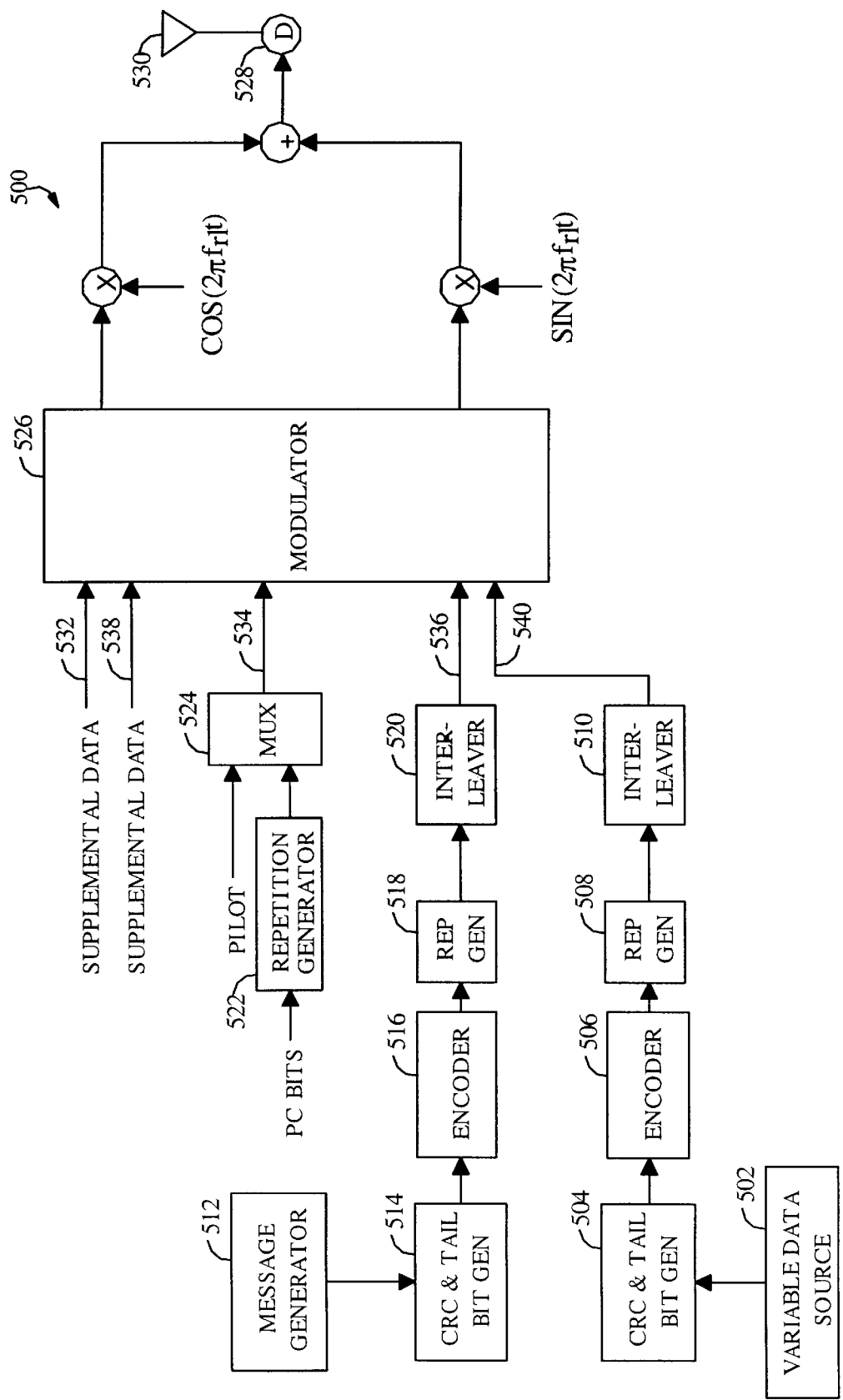
FIG. 5a is a block diagram of the hardware components and interconnections of a digital signal processing apparatus used in accordance with the invention.

FIG. 5a illustrates a functional block diagram of an exemplary embodiment of the transmission system of the present invention embodied in a wireless communication device 500. One skilled in the art will understand that certain functional blocks shown in the figure may not be present in other embodiments of the invention. The block diagram of FIG. 5b corresponds to an embodiment consistent for operation according to the TIA/EIA Standard IS-95C, also referred to as IS-2000, or cdma2000 for CDMA applications. Other embodiments of the present invention are useful for other standards including the Wideband CDMA (WCDMA) standards proposed by the standards bodies ETSI and ARIB. It will be understood by one skilled in the art that owing to the extensive similarity between the reverse link modulation in the WCDMA standards and the reverse link modulation in the IS-95C standard, extension of the present invention to the WCDMA standards may be accomplished.

In the exemplary embodiment of FIG. 5a, the wireless communication device transmits a plurality of distinct channels of information which are distinguished from one another by short orthogonal spreading sequences as described in the U.S. Pat. No. 6,396,804 entitled "HIGH DATA RATE CDMA WIRELESS COMMUNICATION SYSTEM," by Joseph P. Odenwalder. assigned to the assignee of the present invention and incorporated by to reference herein. Five separate code channels are transmitted by the wireless communication device: 1) a first supplemental data channel 532, 2) a time multiplexed channel of pilot and power control symbols 534, 3) a dedicated control channel 536, 4) a second supplemental data channel 538 and 5) a fundamental channel 540. The first supplemental data channel 532 and second supplemental data channel 538 carry digital data which exceeds the capacity of the fundamental channel 540 such as facsimile, multimedia applications, video, electronic mail messages or other forms of digital data. The multiplexed channel of pilot and power control symbols 534 carries pilots symbols to allow for coherent demodulation of the data channels by the base station and power control bits to control the energy of transmissions of the base station or base stations in communication with wireless communication device 500. Control channel 536 carries control information to the base station such as modes of operation of wireless communication device 500, capabilities of wireless communication device 500 and other necessary signaling information. Fundamental channel 540 is the channel used to carry primary information from the wireless communication device to the base station. In the case of speech transmissions, the fundamental channel 540 carries the speech data.

Supplemental data channels 532 and 538 are encoded and processed for transmission by means not shown and provided to modulator 526. Power control bits are provided to repetition generator 522, which provides repetition of the power control bits before providing the bits to multiplexer (MUX) 524. In MUX 524 the redundant power control bits are time multiplexed with pilot FDIG symbols and provided on line 534 to modulator 526.

Message generator 512 generates necessary control information messages and provides the control message to CRC and tail bit generator 504. CRC and tail bit generator 504 appends a set of cyclic redundancy check bits which are parity bits used to check the accuracy of the decoding at the base station and appends a predetermined set of tail bits to the control message to clear the memory of the decoder at the base station receiver subsystem. The message is then provided to encoder 516, which provides forward error correction coding upon the control message. The encoded symbols are provided to repetition generator 518, which repeats the encoded symbols to provide additional time diversity in the transmission. The symbols are then provided to interleaver 520 that reorders the symbols in accordance with a predetermined interleaving format. The interleaved symbols are provided on line 536 to modulator 526.

Variable rate data source 502 generates variable rate data. In the exemplary embodiment, variable rate data source 502 is a variable rate speech encoder such as described in U.S. Pat. No. 5,414,796, entitled "VARIABLE RATE VOCODER," assigned to the assignee of the present invention and incorporated by reference herein. Variable rate vocoders are popular in wireless communications because their use increases the battery life of wireless communication devices and increases system capacity with minimal impact on perceived speech quality. The Telecommunications Industry Association has codified the most popular variable rate speech encoders in such standards as Interim Standard IS-96 and Interim Standard IS-733. These variable rate speech encoders encode the speech signal at four possible rates referred to as full rate, half rate, quarter rate or eighth rate according to the level of voice activity. The rate indicates the number of bits used to encode a frame of speech and varies on a frame by frame basis. Full rate uses a predetermined maximum number of bits to encode the frame, half rate uses half the predetermined maximum number of bits to encode the frame, quarter rate uses one quarter the predetermined maximum number of bits to encode the frame and eighth rate uses one eighth the predetermined maximum number of bits to encode the frame.

Variable rate date source 502 provides the encoded speech frame to CRC and tail bit generator 504. CRC and tail bit generator 504 appends a set of cyclic redundancy check bits which are parity bits used to check the accuracy of the decoding at the base station and appends a predetermined set of tail bits to the control message in order to clear the memory of the decoder at the base station. The frame is then provided to encoder 506, which provides forward error correction coding on the speech frame. The encoded symbols are provided to repetition generator 508, which provides repetition of the encoded symbol. The symbols are then provided to interleaver 510 and reordered in accordance with a predetermined interleaving format. The interleaved symbols are provided on line 540 to modulator 526.

In the exemplary embodiment, modulator 526 modulates the data channels in accordance with a code division multiple access modulation format and provides the modulated information to a transmitter, which amplifies and filters the signal and provides the signal through duplexer 528 for transmission through an antenna. In IS-95 and cdma2000 systems, a 20 ms frame is divided into sixteen sets of equal numbers of symbols, referred to as power control groups. The reference to power control is based on the fact that for each power control group, the base station receiving the frame issues a power control command in response to a determination of the sufficiency of the received reverse link signal at the base station.

Figure 5B:
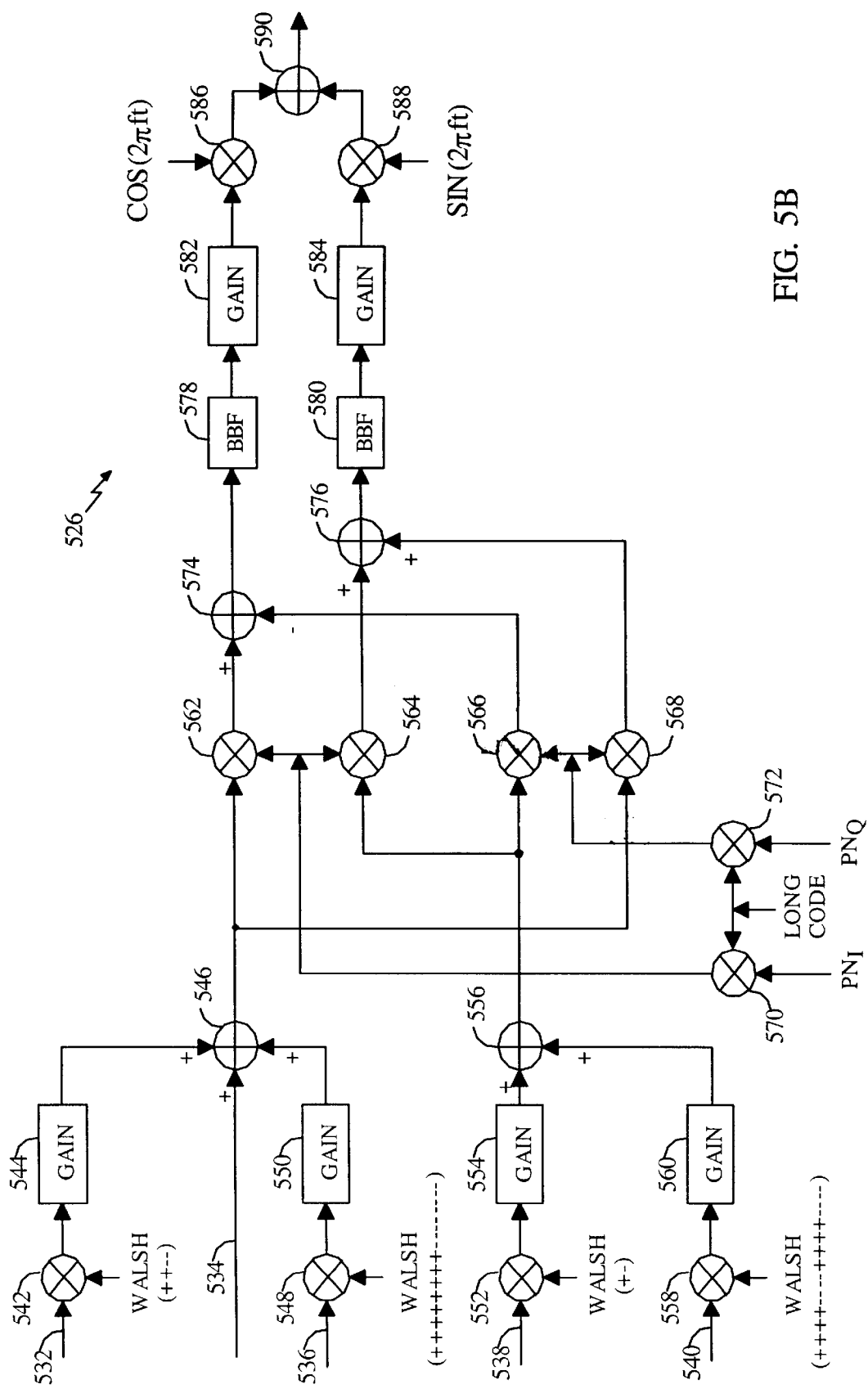
FIG. 5b is a block diagram of the hardware components and interconnections of the modulator 526 shown in FIG. 5a and used in accordance with the invention.

FIG. 5b illustrates a functional block diagram of an exemplary embodiment of modulator 526 of FIG. 5a. The first supplemental data channel data is provided on line 532 to spreading element 542 which covers the supplemental channel data in accordance with a predetermined spreading sequence. In the exemplary embodiment, spreading element 542 spreads the supplemental channel data with a short Walsh sequence (++--). The spread data is provided to relative gain element 544, which adjusts the gain of the spread supplemental channel data relative to the energy of the pilot and power control symbols. The gain adjusted supplemental channel data is provided to a first summing input of summing element 546. The pilot and power control multiplexed symbols are provided on line 534 to a second summing input of summing element 546.

Control channel data is provided on line 536 to spreading element 548 which covers the supplemental channel data in accordance with a predetermined spreading sequence. In the exemplary embodiment, spreading element 548 spreads the supplemental channel data with a short Walsh sequence (++++++++--------). The spread data is provided to relative gain element 550, which adjusts the gain of the spread control channel data relative to the energy of the pilot and power control symbols. The gain adjusted control data is provided to a third summing input of summing element 546. Summing element 546 sums the gain adjusted control data symbols, the gain adjusted supplemental channel symbols and the time multiplexed pilot and power control symbols and provides the sum to a first input of multiplier 562 and a first input of multiplier 568.

The second supplemental channel is provided on line 538 to spreading element 552 which covers the supplemental channel data in accordance with a predetermined spreading sequence. In the exemplary embodiment, spreading element 552 spreads the supplemental channel data with a short Walsh sequence (++--). The spread data is provided to relative gain element 554, which adjusts the gain of the spread supplemental channel data. The gain adjusted supplemental channel data is provided to a first summing input of summer 556.

The fundamental channel data is provided on line 540 to spreading element 558 which covers the fundamental channel data in accordance with a predetermined spreading sequence. In the exemplary embodiment, spreading element 558 spreads the fundamental channel data with a short Walsh sequence (++++----++++----). The spread data is provided to relative gain element 560 that adjusts the gain of the spread fundamental channel data. The gain adjusted fundamental channel data is provided to a second summing input of summing element 556. Summing element 556 sums the gain adjusted second supplemental channel data symbols and the fundamental channel data symbols and provides the sum to a first input of multiplier 564 and a first input of multiplier 566.

In the exemplary embodiment, a pseudonoise spreading using two different short PN sequences ($PN_I$ and $PN_Q$) is used to spread the data. In the exemplary embodiment the short PN sequences, $PN_I$ and $PN_Q$, are multiplied by a long PN code to provide additional privacy. The generation of pseudonoise sequences is well known in the art and is described in detail in U.S. Pat. No. 5,103,459, entitled "SYSTEM AND METHOD FOR GENERATING SIGNAL WAVEFORMS IN A CDMA CELLULAR TELEPHONE SYSTEM," assigned to the assignee of the present invention and incorporated by reference herein. A long PN sequence is provided to a first input of multipliers 570 and 572. The short PN sequence $PN_I$ is provided to a second input of multiplier 570 and the short PN sequence $PN_Q$ is provided to a second input of multiplier 572.

The resulting PN sequence from multiplier 570 is provided to respective second inputs of multipliers 562 and 564. The resulting PN sequence from multiplier 572 is provided to respective second inputs of multipliers 566 and 568. The product sequence from multiplier 562 is provided to the summing input of subtractor 574. The product sequence from multiplier 564 is provided to a first summing input of summing element 576. The product sequence from multiplier 566 is provided to the subtracting input of subtractor 574. The product sequence from multiplier 568 is provided to a second summing input of summing element 576.

The difference sequence from subtractor 574 is provided to baseband filter 578. Baseband filter 578 performs necessary filtering on the difference sequence and provides the filtered sequence to gain element 582. Gain element 582 adjusts the gain of the signal and provides the gain-adjusted signal to upconverter 586. Upconverter 586 upconverts the gain adjusted signal in accordance with a QPSK modulation format and provides the unconverted signal to a first input of summing element 590.

The sum sequence from summing element 576 is provided to baseband filter 580. Baseband filter 580 performs necessary filtering on difference sequence and provides the filtered sequence to gain element 584. Gain element 584 adjusts the gain of the signal and provides the gain-adjusted signal to upconverter 588. Upconverter 588 upconverts the gain adjusted signal in accordance with a QPSK modulation format and provides the upconverted signal to a second input of summing element 590. Summing element 590 sums the two QPSK modulated signals and provides the result to a transmitter (not shown).

Figure 6A:
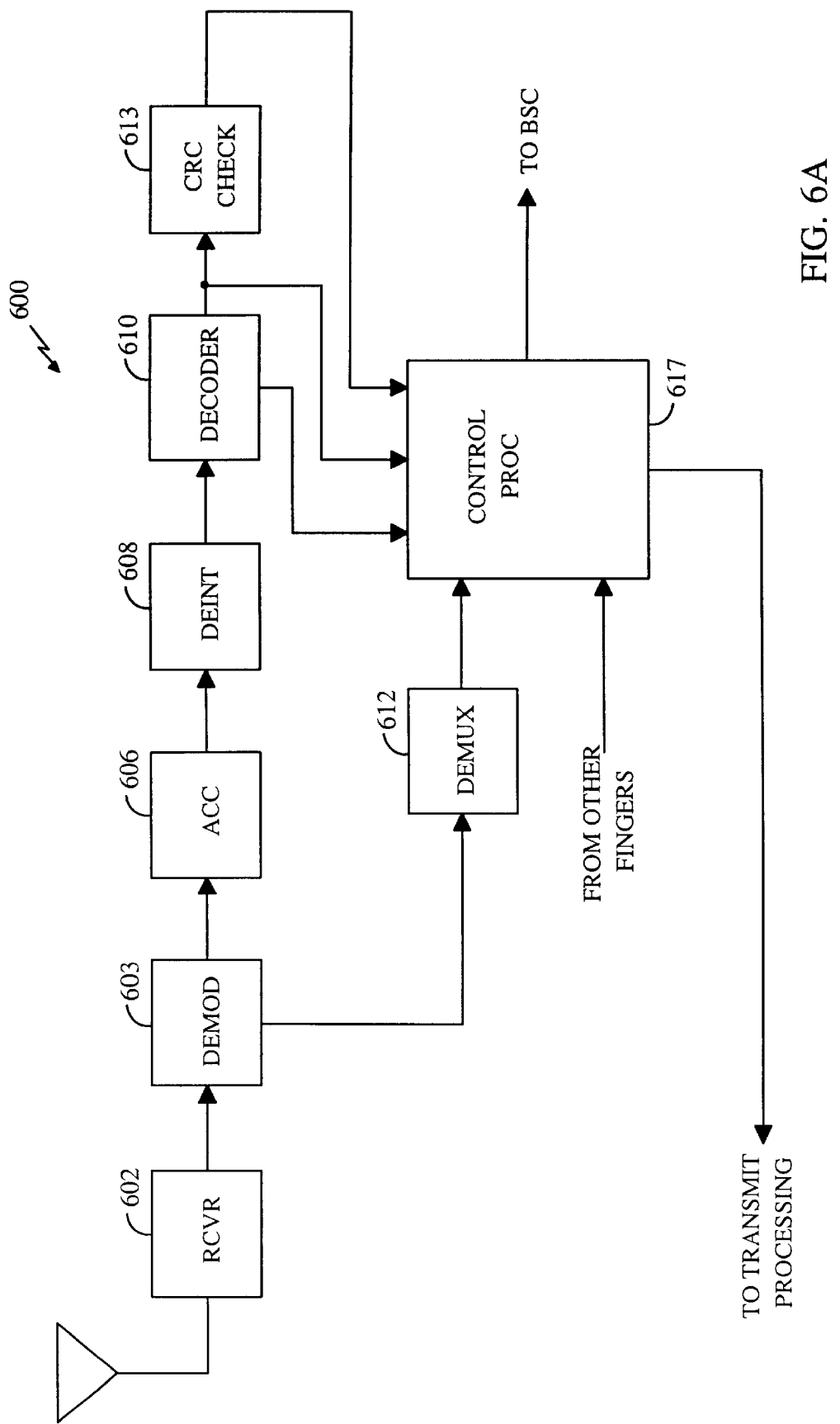
FIG. 6a is a block diagram of a portion of the hardware components and interconnections of a digital signal processing base station apparatus used in accordance with the invention.
Figure 6B:
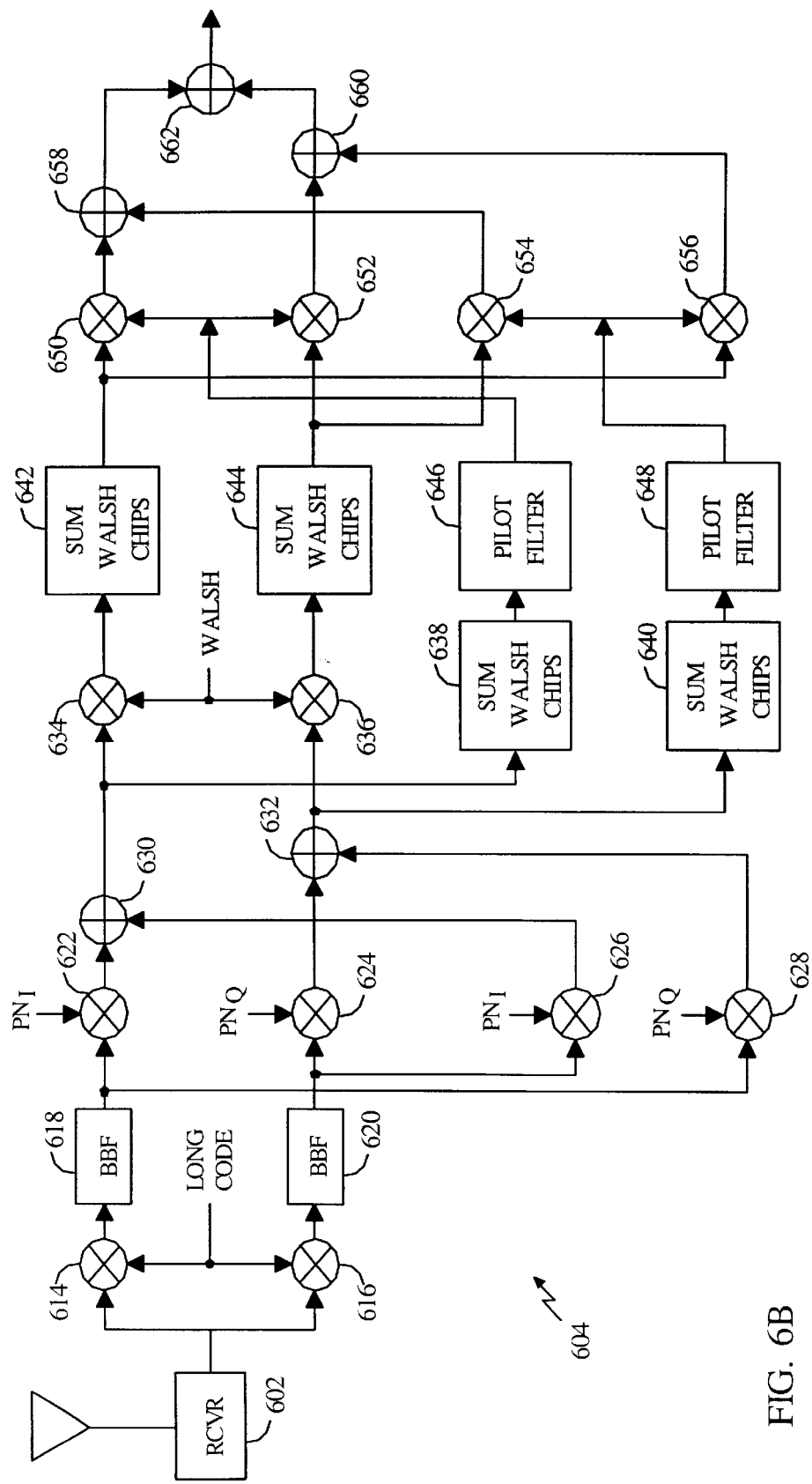
FIG. 6b is a block diagram of the hardware components and interconnections of the demodulator 604 shown in FIG. 6a and used in accordance with the invention.

Turning now to FIG. 6a, a functional block diagram of selected portions of a base station 600 is shown in accordance with the present invention. Reverse link RF signals from the wireless communication device 500 (FIG. 5b) are received by receiver (RCVR) 602, which downconverts the received reverse link RF signals to an baseband frequency. In the exemplary embodiment, receiver 602 down converts the received signal in accordance with a QPSK demodulation format. Demodulator 604 then demodulates the baseband signal. Demodulator 604 is further described with reference to FIG. 6b below.

The demodulated signal is provided to accumulator 606. Accumulator 606 sums the symbol energies of the redundantly transmitted power control groups of symbols. The accumulated symbol's energies are provided to de-interleaver 608 and reordered in accordance with a predetermined de-interleaving format. The reordered symbols are provided to decoder 610 and decoded to provide an estimate of the transmitted frame. The estimate of the transmitted frame is then provided to CRC check 613 which determines the accuracy of the frame estimate based on the CRC bits included in the transmitted frame.

In the exemplary embodiment, base station 600 performs a blind decoding on the reverse link signal. Blind decoding describes a method of decoding variable rate data in which the receiver does not know a priori the rate of the transmission. In the exemplary embodiment, base station 600 accumulates, deinterleaves and decodes the data in accordance with each possible rate hypothesis. The frame selected as the best estimate is based on quality metrics such as the symbol error rate, the CRC check and the Yamamoto metric.

An estimate of the frame for each rate hypothesis is provided to control processor 617 and a set of quality metrics for each of the decoded estimates is also provided. Quality metrics that may include the symbol error rate, the Yamamoto metric and the CRC check. Control processor selectively provides one of the decoded frames to the remote station user or declares a frame erasure.

In the preferred embodiment, demodulator 603 shown in FIG. 6a has one demodulation chain for each information channel. An exemplary demodulator 603 performs complex demodulation on signals modulated by an exemplary modulator. As previously described, receiver (RCVR) 602 downconverts the received reverse link RF signals to a baseband frequency, producing Q and I baseband signals. Despreaders 614 and 616 respectively despread the I and Q baseband signals using the long code from FIG. 5a. Baseband filters (BBF) 618 and 620 respectively filter the I and Q baseband signals.

Despreaders 622 and 624 respectively despread the I and Q signals using the PN, sequence of FIG. 5b. Similarly, despreaders 626 and 628 respectively despread the Q and I signals using the $PN_Q$ sequence of FIG. 5b. The outputs of despreaders 622 and 624 are combined in combiner 630. The output of despreader 628 is subtracted from the output of despreader 624 in combiner 632. The respective outputs of combiners 630 and 632 are then Walsh-uncovered in Walsh-uncoverers 634 and 636 with the Walsh code that was used to cover the particular channel of interest in FIG. 5b. The respective outputs of the Walsh-uncoverers 634 and 636 are then summed over one Walsh symbol by accumulators 642 and 644.

The respective outputs of combiners 630 and 632 are also summed over one Walsh symbol by accumulators 638 and 640. The respective outputs of accumulators 638 and 640 are then applied to pilot filters 646 and 648. Pilot filters 646 and 648 generate an estimation of the channel conditions by determining the estimated gain and phase of the pilot signal data 534 (see FIG. 5a). The output of pilot filter 646 is then complex multiplied by the respective outputs of accumulators 642 and 644 in complex multipliers 650 and 652. Similarly, the output of pilot filter 648 is complex multiplied by the respective outputs of accumulators 642 and 644 in complex multipliers 654 and 656. The output of complex multiplier 654 is then summed with the output of complex multiplier 650 in combiner 658. The output of complex multiplier 656 is subtracted from the output of complex multiplier 652 in combiner 660. Finally, the outputs of combiners 658 and 660 are combined in combiner 662 to produce the demodulated signal of interest.

Despite the specific foregoing descriptions, ordinarily skilled artisans having the benefit of this disclosure will recognize that the apparatus discussed above may be implemented in a machine of different construction without departing from the scope of the present invention. Similarly, parallel methods may be developed. As a specific apparatus example, one of the components such as summing element 622, shown in FIG. 6b, may be combined with summing element 626 even though they are shown as separate elements in the functional diagram.

Signal-Bearing Media

Figure 7:
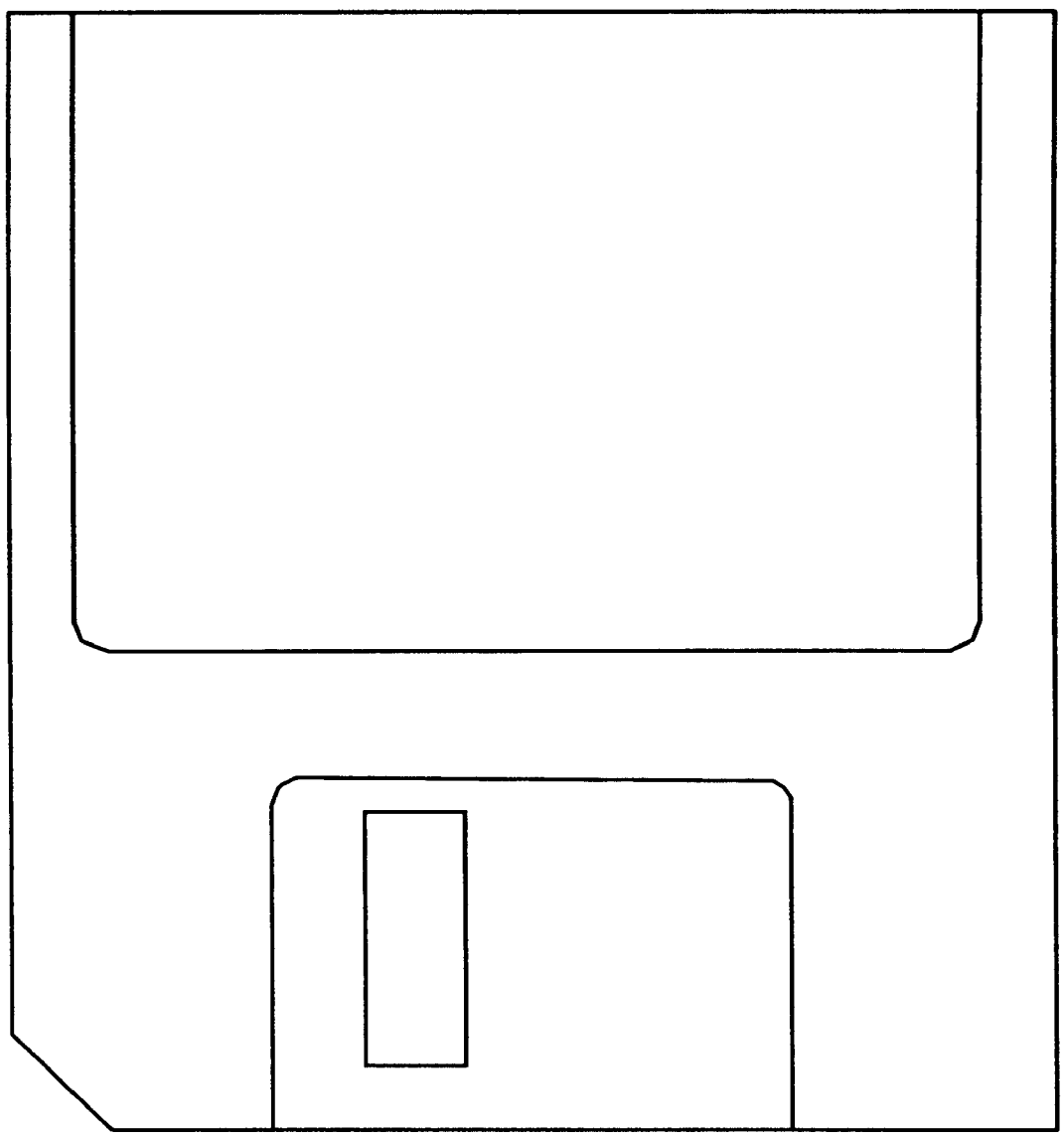
FIG. 7 is an exemplary embodiment of a digital data storage medium in accordance with the present invention.

The methods described above may be implemented, for example, by operating a base station to execute a sequence of machine-readable instructions. These instructions may reside in various types of signal bearing media such as illustrated in FIG. 7. In this respect, one embodiment of the invention concerns a programmed product, or article of manufacture, comprising signal-bearing media tangibly embodying a program of machine-readable instructions executable by a digital signal processor to perform the methods discussed above.

The signal bearing media may comprise any type of digital data storage media. For example, this storage media includes an application specific integrated circuit (ASIC), a digital data or optical storage device accessible by the base station, electronic read-only memory, or other suitable signal bearing media. In an illustrative embodiment of the invention, the machine-readable instructions may comprise software object code, compiled from a language such as C, C+, C++; or other coding language.

OTHER EMBODIMENTS

While there have been shown what are presently considered to be exemplary embodiments of the invention, it will be apparent to those skilled in the art that various changes and modifications can be made without departing from the scope of the invention as defined by the appended claims.

What is claimed is:

1. A method for predicting a favored slot for transmitting data in a wireless communication system, the method comprising the steps of:

transmitting signals between a base location and a remote station via at least one first channel, wherein the transmitted signals comprise voice-data;

measuring at the base location transmission power levels for the voice-data transmitted via the at least one first channel;

determining a dynamic transmission power level for at least one first channel; and using the dynamic transmission power level to select a second channel transmission slot and data rate for transmitting additional data on a second channel.

2. The method in accordance with claim 1, further comprising the steps of:

measuring at the remote location transmission metrics reflecting the quality of voice-data signals received from the base location;

messaging from the remote location to the base location any change or non-change in the voice-data quality; and adjusting or not adjusting transmission power in consideration of voice-data transmitted by the base location.

3. A signal bearing medium tangibly embodying a program of machine-readable instructions executable by a digital signal processing apparatus to perform a method for predicting a favored slot for transmitting data in a wireless communication system, the instructions comprising the method steps of:

transmitting signals containing voice-data between a base location and a remote location;

measuring at the base location transmission power levels for voice-data transmitted via at least one first channel;

determining a historical profile for the transmission power levels; and using the historical profile of the transmission power levels to select a second channel transmission power level and data rate for transmitting additional data on a second channel.

4. A signal bearing medium tangibly embodying a program of machine-readable instructions executable by a digital signal processing apparatus to perform a method for predicting a favored slot for transmitting data in a wireless communication system, the instructions comprising the method steps of:

transmitting signals containing voice-data between a base location and a remote location;

measuring at the base location transmission power levels for voice-data transmitted via at least one first channel;

determining a dynamic transmission power level; and using the dynamic transmission power level to select a second channel transmission slot and data rate for transmitting additional data on a second channel.

5. An apparatus used to predict a favored slot for transmitting data between a base location and a remote station in a wireless communication system, the apparatus comprising:

a base location communicatively coupled to a remote station, wherein the base location may communicate with the remote station using more than one channel, the base location comprising:

a transmitter, the transmitter capable of transmitting voice and non-voice data signals between a base location and a remote station; and a digital signal processing apparatus communicatively coupled to the transmitter and capable of executing instructions to:

measure at the base location transmission power levels for voice-data transmitted to the remote station via at least one first channel;

determining an dynamic transmission power level for transmissions made via the at least one first channel; and using the dynamic transmission power level to select a second channel transmission slot for transmitting additional data to the remote station on a second channel.

6. The apparatus in accordance with claim 5, further comprising;

a measuring means for measuring at the remote station transmission metrics reflecting the quality of voice-data signals received from the base location;

a messaging means for messaging to the base location a value indicting any change or non-change in the voice-data quality; and a means for adjusting or not adjusting the transmission power in consideration of voice-data quality.

* * * * *